United States Patent Office 3,247,262
Patented Apr. 19, 1966

---

3,247,262
PROCESS FOR MAKING POLYPHENOLS
Warren W. Kaeding, Concord, Calif., assignor to The Dow Chemical Company, Midland, Mich., a corporation of Delaware
No Drawing. Filed Nov. 17, 1961, Ser. No. 153,193
9 Claims. (Cl. 260—620)

This invention relates to a new process for making polyphenols, by which term is meant biphenols, triphenols, and higher polyphenols, by the oxidative coupling of substituted or unsubstituted phenols. These polyphenols are useful as polyfunctional intermediates for the preparation of resinous materials such as polyesters and polyethers and the substituted biphenols are particularly valuable as stabilizers for the protection of various substances against oxidative degradation.

Phenols have previously been oxidatively coupled, particularly to make the corresponding biphenols, by the use of a variety of oxidizing agents. For example, inorganic oxidizing agents such as nitric acid, ferric chloride, potassium ferricyanide, and chromic acid have been used for the purpose. Organic oxidizing agents such as organic peroxides and lead tetraacetate have also been employed to make biphenols by this method. All of these known reagents have certain disadvantages when used in this reaction. These may include low yields, simultaneous production of contaminating by-products such as oxidized ring structures, and the necessity of using dilute solutions and long reaction periods. Some of the reagents are relatively expensive and in all cases, the oxidizing agent is lost in the process.

The present invention rests in the discovery that phenols are coupled to make the corresponding biphenols or higher polyphenols in good yields by the reaction of a cupric salt of an organic carboxylic acid with a molten phenol at about 140–225° C. In the reaction, the cupric carboxylate is reduced to the cuprous salt and it may be restored to the cupric state by exposure to oxygen, for example, by bubbling air through the reaction mixture. This reoxidation may be carried out concurrently with the reaction, in which event the cupric salt is in effect serving as a carrier for atmospheric oxygen. The following equations show the reactions involved, the preparation of an o,o'-biphenol from a 2,4-disubstituted phenol being used for purpose of illustration:

(1)
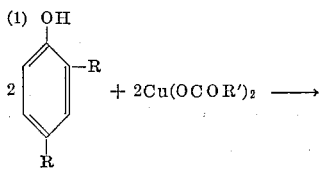

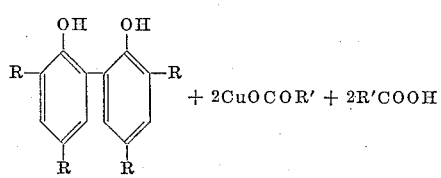

(2)   $2CuOCOR' + 2R'COOH + \tfrac{1}{2}O_2$
      $\rightarrow 2Cu(OCOR')_2 + H_2O$ When Equations 1 and 2 are combined, there is obtained the net Equation 3 which illustrates the fundamental reaction.

(3)
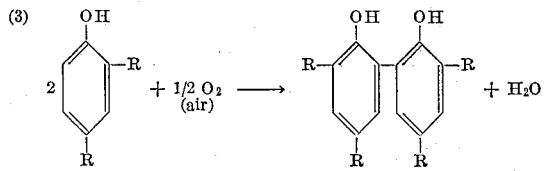

The phenols operable in the process are those phenols known to be coupled by reaction with oxidizing agents to form biphenols or higher polyphenols. These phenols are characterized by having at least one vacant and relatively unhindered position ortho or para to the phenolic hydroxyl group.

Suitable phenols are represented by the formula:

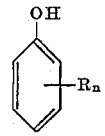

wherein each R is alkoxy, alkyl, cycloalkyl, or phenyl, $n$ is a number from zero to four inclusive, and wherein at least one of the three positions on the benzene ring ortho and para to the hydroxyl group is unsubstituted and available in the reaction. As is known in the general reaction, such an unsubstituted position must be relatively unhindered by bulky substituents immediately adjacent to it to be practically reactive. Ordinarily, adjacent alkyl substituents larger than methyl are disadvantageous. Representative of such phenols are phenol itself, o-cresol, m-tert-butylphenol, p-ethoxyphenol, o-cyclohexylphenol, p-phenylphenol, 2,6-xylenol, 4-methylthymol, 3,4-diethoxyphenol, 2-tert-butyl-p-cresol, 2-cyclopentyl-p-cresol, 2,4-di-tert-amylphenol, 2-tert-butyl-4-methoxyphenol, 2,4-dioctylphenol, 4-cyclohexyl-o-cresol, 4,6-di-tert-butyl-m-cresol, 6-tert-butyl-3,4-xylenol, 6-tert-butyl-4-ethoxy-m-cresol, 2,3,4,5-tetramethylphenol, and homologs, analogs, and isomers of these which have the type of structure defined.

Phenols having more than one available unsubstituted position ortho or para to the hydroxyl group are prone to give resinous polyphenols as the principal product of reaction. By using relatively large amounts of cupric salts and by shortening the reaction time, the proportion of biphenols and triphenols in the product may be increased.

In the reaction of a cupric carboxylate with such phenols which have both an ortho and a para position open and available for coupling, ortho coupling takes place preferentially. In this respect, the action of cupric carboxylates differs from that of other oxidizing agents in this reaction. For example, lead tetraacetate produces the p,p'-biphenol type of compound when reacted with such phenols.

Di-, tri-, or tetrasubstituted phenols having substituents occupying both ortho positions or one ortho position and the para position and consequently with only one reactive position left vacant in the ring can of course yield only biphenols in the reaction. Best yields of biphenols are obtained from these phenols when some of the alkyl or alkoxy substituents are relatively bulky radicals, for example, where such groups as isopropyl, tertbutyl, tert-amyl, and tert-octyl are present. Biphenols having such substitutents have, in general, relatively high activity as antioxidants and the process therefore has particular application in the preparation of these compounds.

The cupric oxidizing agent may be a cupric salt of any of various kinds of organic carboxylic acids. The necessary properties of operable cupric carboxylates are thermal stability at process temperatures, the absence of interfering groups which would react in the process, and at least a slight but significant degree of solubility in the molten phenol reaction mixture. Acids forming suitable cupric salts include alkanoic acids of two to about twelve carbon atoms, aliphatic dicarboxylic acids of about four to about ten carbon atoms, aromatic and alkyl-substituted aromatic mono and dicarboxylic acids, and alicyclic and heterocyclic carboxylic acids which fulfill the above conditions. Representative examples of such acids are alkanoic acids such as acetic acid, butyric acid, caprylic acid, lauric acid, alkanedicarboxylic acids such as succinic acid, adipic acid, sebacic acid, benzoic acid, and lower alkyl benzoic acids such as toluic acid, dimethylbenzoic acid, butylbenzoic acid, phthalic acid, terephthalic acid, cyclohexanecarboxylic acid, furoic acid, and others of similar nature. The cupric salt of o-toluic acid is particularly preferred for its relative high solubility in the molten phenol reaction mixture.

The process may be operated within the approximate temperature range of 140–225° C. and I prefer to run at about 160–200° C. for best results.

The relative proportions of cupric salt and phenol in the reaction mixture are not critical and may be varied widely. Ordinarily, it is most convenient to use a large excess of phenol in the reaction, the excess phenol serving as a convenient solvent for the reaction mixture. Free carboxylic acid may be used with the cupric carboxylate to increase the solubility of the copper salt in the reaction mixture and to improve the yield of cupric carboxylate upon regeneration with oxygen.

Although no solvent is ordinarily used in the reaction other than the excess phenol present, solvents which are inert in the reaction and of suitably high boiling point may be used if desired. Such solvents include the higher-boiling aliphatic and aromatic hydrocarbons and aromatic ethers. Solvents having boiling points lower than the temperatures at which the process operates may be used and the process run under superatmospheric pressure, but this is not usually desirable.

Since the cupric carboxylate oxidizing agent can be regenerated by contacting the reduced cuprous salt with oxygen, the process may be operated in a number of different ways.

The reaction can be run most simply by heating a phenol-cupric carboxylate mixture to about 140–225° C., whereupon a homogeneous solution is formed and the coupling reaction occurs substantially immediately as indicated by a change in the color of the solution from a bluish or greenish color to yellow or tan. The reaction mixture may then be worked up to separate the desired product by any of a number of well known procedures. One convenient method includes cooling the mixture to a suitable temperature and diluting it with about an equal volume of a relatively low-boiling solvent such as ethyl ether or hexane, thereby precipitating most of the cuprous carboxylate formed and possibly some of the free carboxylic acid where that acid is a solid. The filtrate may then be extracted with dilute aqueous sulfuric acid to remove any cupric salts present and with saturated sodium bicarbonate solution to separate the free carboxylic acid present. The extracted solution can be reduced in volume by evaporation or distillation of the solvent, thereby causing separation of the product, or the solution can be distilled to obtain the solvent, unreacted phenol, and the biphenol or polyphenol product as separate fractions.

The reaction may also be run in a series of alternating reacting and regenerating steps where the phenol-cupric carboxylate mixture is first heated to a reaction temperature in the range of 140–225° C., then cooled to about 100–140° C. at which temperature the reaction mixture is contacted with oxygen, usually in the form of air, until substantially all the cuprous carboxylate formed in the reaction is oxidized to the cupric state. This cycle of operation may then be repeated until the desired level of conversion is reached so long as the reaction mixture remains manageably fluid. The biphenol or polyphenol product may then be separated from the mixture as described above.

A third mode of operation involves aeration of the reaction mixture at 140–225° C. whereby the coupling reaction and the reoxidation of the cuprous salt are brought about concurrently. This method of running the reaction has an obvious advantage in convenience of operation.

This process is capable of many other variations in operation and separation of product as will be obvious to the chemist. The preferred method of operation varies according to the particular compound being oxidized and the scale of operation. Some illustrative preparations are described in the examples which follow.

EXAMPLE 1

The reactor was a glass tube about two inches in diameter and about two feet long with a closed lower end and a top end having a thermowell, a connection to a condenser, and a gas inlet tube extending to the bottom.

A mixture of 50 g. of cupric benzoate and 150 g. of 2,4-di-tert-butyl phenol was heated in this reactor to 200° C. in 5–10 minutes. Nitrogen was bubbled through the molten phenol to supply agitation. At about 175° C. the cupric benzoate dissolved and immediately reacted to give a yellow, slightly turbid solution. This was cooled and an approximately equal volume of ether was added. The brownish cuprous benzoate which precipitated was separated by filtration. It amounted to 29.3 grams. The blue-green ether filtrate was extracted with 10 ml. of 5 percent sulfuric acid to remove a small amount of cupric ion formed by exposure to the atmosphere in the filtration step. Extraction of the ether solution with saturated $NaHCO_3$ solution and acidification of the aqueous extract yielded 16.6 g. of benzoic acid. The extracted ether solution was distilled to remove first the solvent and then the unreacted phenol of which 113 grams was thus recovered. The distillation residue was crude 4,4′,6,6′-tetra-tert-butyl-o,o′-biphenol. This was recrystallized from pentane to give 33 grams of purified material, M.P. 190–191° C.

EXAMPLE 2

A reaction mixture of 200 g. of 2,4-di-tert-butylphenol, 50 g. of benzoic acid, and 25 g. of cupric benzoate was heated rapidly to 190° C. in the reactor described in Example 1. The yellow solution which formed was immediately cooled to 140° C. and the nitrogen which was being bubbled through the reaction mixture for agitation was replaced by air at 0.8 liter per minute. After 20 minutes of such aeration at 140° C., the reaction mixture, which was then a blue-green slurry, was again heated to 180–190° C., the air being replaced by nitrogen. An amber solution was obtained and this was cooled and aerated as before. This cycle of operation was repeated until a total of 120 liters of air had been passed through the reaction mixture. The product was worked up as before to obtain 147 g. of crude 4,4′,6,6′,-tetra-tert-butyl-o,o′-biphenol, M.P. 185–190° C., and 43 g. of unreacted dibutylphenol.

EXAMPLE 3

The reactor of Example 1 was loaded with 170 g. of 2,4-di-tert-butylphenol and 35 g. of cupric o-toluate and the mixture was heated to about 170° C. Air at the rate of 0.8 liter per minute was then bubbled through the solution for 150 minutes at 165–175° C. The air was then shut off and the reaction mixture was heated momentarily to 185° C. The liquid was added to 750 ml. of hexane and the reactor was rinsed with an additional 250 ml. of hexane. A fine solid was present and was filtered off. It amounted to 30.8 g. and was a mixture of cuprous o-toluate and free toluic acid. The hexane-soluble copper salts and toluic acid were removed by extractions with dilute sulfuric acid and saturated aqueous bicarbonate solution as before. Eight grams of o-toluic acid was recovered. The hexane solution was decolorized with charcoal, reduced in volume, and several crops of crystals were separated. A total weight of 96.5 g. of 4,4′,6,6′-tetra-tert-butyl-o,o′-biphenol was thus obtained.

EXAMPLE 4

In the reactor previously described, a mixture of 150 g. of 2,6-xylenol and 75 g. of cupric benzoate was heated rapidly to 180° C., then cooled and worked up as in Example 1. A yield of 23 g. of 4,4'-bi-2,6-xylenol was obtained.

EXAMPLE 5

A mixture of 46 g. of 4,6-di-tert-butyl-m-cresol and 50 g. of cupric o-toluate was heated to 220° C. in 25 minutes while being agitated by nitrogen bubbling. The viscous, dark amber solution was then cooled and diluted with ether, causing precipitation of 28.5 g. of cuprous o-toluate which was filtered off. Extraction of the filtrate with bicarbonate solution yielded 19 g. of o-toluic acid. The extracted ether solution was reduced in volume by evaporation and 19 g. of a white solid separated. This was recrystallized from hexane to give white crystals, M.P. 246–249° C. This material was identified as 4,4',6,6'-tetra-tert-butyl-2,2'-bi-m-cresol.

EXAMPLE 6

A mixture of 24 g. of 2-tert-butyl-4-ethoxyphenol and 21 g. of cupric o-toluate was heated to 195° C., then cooled and worked up as in Example 5. Recovered unreacted starting material amounted to 13.5 g. and 4 g. of 6,6'-di-tert-butyl-4,4'-diethoxy-o,o'-biphenol was obtained. A recrystallized sample of the product had a melting point of 91–95° C.

Table I lists other di- and tri-substituted phenols which were reacted as in the foregoing examples to make the corresponding o,o'-biphenols.

*Table I*

| Phenol | Catalyst | Max. Temp., °C. | Percent Yield |
|---|---|---|---|
| 2,4-di-tert-butylphenol | Cupric acetate | 180 | 100 |
| 2,4-xylenol | Cupric benzoate | 170 | 75 |
| 6-tert-butyl-3,4-xylenol | do | 190 | 85 |
| 2-tert-butyl-p-cresol | do | 180 | 91 |
| 2,4-di-tert-amylphenol | do | 195 | (*) |

*A technical grade of starting phenol was used and the yield was not calculated. The product was an amber glass.

In addition to the di- and tri-substituted phenols shown above, phenol itself and the cresols were reacted with cupric benzoate as described in the examples to produce resinous polyphenols. The product from the oxidation of phenol was a viscous liquid which could not be distilled. It was completely soluble in 5 percent aqueous sodium hydroxide and infrared examination showed that coupling in the ortho position was favored. The cresols yielded products of a similar nature when reacted under these conditions.

I claim:

1. In an oxidative coupling process wherein at least two phenolic rings are directly linked to make a polyphenol by the reaction of an oxidizing agent with a phenol having at least one unsubstituted and reactive ring position other than meta to the phenolic hydroxyl, said phenol having only the phenolic hydroxyl group as a functional substituent, the improvement wherein a reaction mixture consisting essentially of said phenol and, as the oxidizing agent, the cupric salt of an organic carboxylic acid is heated at about 140° C. to about 225° C., thereby forming a product comprising a polyphenol and the cuprous salt of said acid, and wherein said acid is selected from the group consisting of alkanoic acids of 2–12 carbon atoms, alkanedicarboxylic acids of 4–10 carbon atoms, benzoic acid, lower alkyl benzoic acids, benzene-dicarboxlic acids, cyclohexanecarboxylic acid, and furoic acid.

2. A process as described in claim 1 wherein the heated mixture is cooled to 100–140° C., contacted at 100–140° C. with an oxygen-containing gas until substantially all the cuprous carboxylate has been oxidized to the cupric state, the mixture is reheated to about 140° C. to about 225° C., and this cycle of operation is repeated until a desired level of phenol coupling has been attained.

3. A process as described in claim 1 wherein the heated mixture is concurrently contacted with an oxygen-containing gas.

4. A process as described in claim 3 wherein the mixture additionally contains a significant amount of the free carboxylic acid corresponding to the cupric carboxylate.

5. A process as described in claim 1 wherein the cupric salt is cupric o-toluate.

6. A process for making a polyphenol which comprises heating a mixture of phenol and a cupric salt of an organic carboxylic acid as defined in claim 1 at about 140° C. to about 225° C. and separating the thereby formed polyphenol from the reaction mixture.

7. A process for making 4,4',6,6'-tetra-tert-butyl-o,o'-biphenol which comprises heating a mixture of 2,4-di-tert-butylphenol and a cupric salt of an organic carboxylic acid as defined in claim 1 at about 140° C. to about 225° C. and separating the thereby formed 4,4',6,6'-tetra-tert-butyl-o,o'-biphenol from the reaction mixture.

8. A process for making 6,6'-di-tert-butyl-2,2'-bi-p-cresol which comprises heating a mixture of 2-tert-butyl-p-cresol and a cupric salt of an organic carboxylic acid as defined in claim 1 at about 140° C. to about 225° C. and separating the thereby formed 6,6'-di-tert-butyl-2,2'-bi-p-cresol from the reaction mixture.

9. A process for making 4,4',6,6'-tetra-tert-amyl-o,o'-biphenol which comprises heating a mixture of 2,4-di-tert-amylphenol and a cupric salt of an organic carboxylic acid as defined in claim 1 at about 140° C. to about 225° C. and separating the thereby formed 4,4',6,6'-tetra-tert-amyl-o,o'-biphenol from the reaction mixture.

References Cited by the Examiner

UNITED STATES PATENTS

| | | | |
|---|---|---|---|
| 2,479,949 | 8/1949 | Luten, et al. | 260—620 X |
| 2,727,926 | 12/1955 | Kaeding et al. | 260—620 X |
| 2,885,444 | 5/1959 | Fookes et al. | 260—620 |

FOREIGN PATENTS 536,277   10/1931   Germany.

LEON ZITVER, *Primary Examiner.*

CHARLES B. PARKER, *Examiner.*